United States Patent
Barrau et al.

(10) Patent No.: US 7,206,345 B2
(45) Date of Patent: Apr. 17, 2007

(54) METHOD OF DECODING CODED VIDEO SIGNALS

(75) Inventors: Eric Barrau, Puteaux (FR); Philippe Gatepin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 708 days.

(21) Appl. No.: 10/321,206

(22) Filed: Dec. 17, 2002

(65) Prior Publication Data

US 2003/0128764 A1 Jul. 10, 2003

(30) Foreign Application Priority Data

Dec. 20, 2001 (FR) .................................... 01 16578

(51) Int. Cl.
*H04N 7/12* (2006.01)
(52) U.S. Cl. .............. 375/240.1; 375/240; 375/240.01; 375/240.12
(58) Field of Classification Search ................ 375/240, 375/240.01, 240.1, 240.12, 240.16, 240.2
See application file for complete search history.

(56) References Cited

U.S. PATENT DOCUMENTS 5,818,531 A * 10/1998 Yamaguchi et al. ...... 375/240.2
6,173,013 B1 * 1/2001 Suzuki et al. .......... 375/240.16

FOREIGN PATENT DOCUMENTS

WO WO0126381 4/2001

OTHER PUBLICATIONS

I-W Tsei et al; "Hybrid Cell Loss Concealment Methods for MPEG-II-Based Packet Video", Signal Processing, Image Communication, Elsevier Science Publishers, Amsterdam, NL, vol. 9, Nr. 2, pp. 99-124 XP000638965.
Kuroda Hideo et al; "Variable Bit Rate Video Coding Method", Electronics & Communications in Japan, Part I, Communications, Scripta Technica, NY, vol. 76, Nr. 4, pp. 35-45, XP000417796.

* cited by examiner

*Primary Examiner*—Allen Wong
(74) *Attorney, Agent, or Firm*—Larry Liberchuk

(57) ABSTRACT

The invention relates to a video decoding method for decoding a set of video signals comprising a base layer signal and at least one enhancement layer signal and for supplying a decoded output signal, said decoding method comprising:
- a first decoding step for decoding the base layer signal and supplying a decoded base layer signal, said first step being associated with a compensating step for motion compensation of a reference image,
- a second decoding step for decoding the enhancement layer signals and supplying decoded enhancement layer signals,
- a combining step for combining the decoded base layer signal and the decoded enhancement layer signals to supply said decoded output signal.

The decoding method is characterized in that it comprises a selection step for selecting, as a function of a selection signal, the signal from which said reference image is taken, the selection being made from said decoded base layer signal and said decoded output signal. The decoding method thus allows optimum quality to be obtained for the decoded output signal irrespective of the characteristics of the coding which produced said base layer to be decoded.

5 Claims, 6 Drawing Sheets

METHOD OF DECODING CODED VIDEO SIGNALS

The invention relates to a video decoding method for decoding a set of video signals comprising a base layer signal and at least one enhancement layer signal and for supplying a decoded output signal, said decoding method comprising:

a first decoding step for decoding the base layer signal and supplying a decoded base layer signal, said first step being associated with a compensating step for motion compensation of a reference image, a second decoding step for decoding the enhancement layer signals and supplying decoded enhancement layer signals, a combining step for combining the decoded base layer signal and the decoded enhancement layer signals to supply said decoded output signal.

The invention has a large number of applications in video signal decoders.

To transmit data of the video type over a communications network, it is possible to have recourse to a video compression technique that, from a video-input signal, generates a set of compressed video signals of decreasing quality. This set of signals, of the so-called scalable type, comprises a base layer signal that is coded under the MPEG-2 standard (termed the base layer) and at least one enhancement layer signal (termed the enhancement layer). When such enhancement layer signals are transmitted jointly with the base layer signal, they enhance the quality of the decoded video output signal by being added to the decoded base layer signal.

Patent WO 0126381 describes a decoding method for decoding a base layer signal that is transmitted with enhancement layer signals. This decoding method, which is shown in FIG. 1 of the present application, comprises a decoding step 101 for decoding the base layer signal 102, and a decoding step 103 for decoding the enhancement layer signals 104. The decoding step 101 is associated with a compensating step 105 for the motion compensation of a reference image taken from the decoded base layer signal 106. Having been motion-compensated in this way, the reference image is added to an image of the coded base layer signal 102. This decoding method also comprises a combining step 107 for adding the content of the decoded base layer signal 106 and the content of the decoded enhancement layer signals 108 together to produce a decoded output signal 109.

This known prior art decoding method has a number of limitations.

When operating, what this decoding method uses as a reference image is an image taken from the output of the decoding step 101. This is not the ideal reference image to select when the base layer signal 102 is the product of coding that employs a reference image different than a decoded image taken from the decoded base layer signal. To show this, let us consider a set of signals generated by a coding method of the code conversion type, as shown in FIG. 2. From a compressed video input signal 201, which is compressed under the MPEG-2 standard for example, this method of code conversion generates a base layer signal 202 and an enhancement layer signal 203. For this purpose, the input signal 201, having been quantized by a factor IQ1 when being coded (not shown), is subject to a dequantizing step 204 in which it is dequantized by a factor IQ1 and then a quantizing step 205 where it is quantized by a factor Q2, where Q2>Q1. The quantizing step 205 enables said base layer signal 202 to be generated. Via a dequantizing step 206, the quantizing error 208 in step 205 is calculated by a subtraction step 207. The quantizing error is then subjected to an entropy-coding step 209 to generate said enhancement layer signal 203. It is characteristic of this code conversion method that there is no motion compensation for the coding of the base layer signal. Consequently, the theoretical image for the coding of the base layer signal is the decoded input image of signal 201. If a set of signals 202–203 of this kind is decoded by a decoding method such as that known in the prior art, the reference image used for decoding the base layer signal will be an image taken from the output of the decoding step 101, and not one taken from the decoded output signal 109 as should be the case. Decoded output signal 109 is in fact theoretically identical to input signal 201. This being the case, the reference image used for the motion compensation is not the right one and as a result a drift in quality occurs in the decoded output signal 109. The known, prior art decoding method thus generates a decoded output signal of poor quality, and of a quality that decreases from image to image.

It is an object of the invention to propose a video decoding method for decoding a set of signals made up of a base layer signal and a set of enhancement layer signals, said decoding method producing a decoded output signal of better quality.

It is also an object of the invention to propose a video coding and code-conversion method for generating a set of signals made up of a base layer signal and a set of enhancement layer signals, which set of signals is intended to be decoded by a decoder according to the invention.

For this purpose, the decoding method is notable in that it comprises a selection step for selecting, as a function of a selection signal, the signal from which said reference image is taken, the selection being made from said decoded base layer signal and said decoded output signal.

Inasmuch as the base layer signal may have been coded by a coding or code-conversion method employing reference images taken from different signals, such as a base layer signal produced by coding with or without motion compensation, this selection step enables the decoder to adapt to the coding characteristics of the coded base layer signal. Hence, when the decoder according to the invention receives a base layer signal produced by, for example, non-motion-compensated coding (or code conversion), the selection step is able advantageously to select as the reference image an image taken from the decoded output signal. When, on the other hand, the decoder according to the invention receives a base layer signal produced by, for example, motion-compensated coding (or code conversion), the selection step is able advantageously to select as the reference image an image taken from the decoded base layer signal. The invention thus enables selection of the signal from which the reference image used in the motion-compensating sub-step is taken. In this way, by making the appropriate choice in the selection, there is no longer any drift in quality and the quality of the decoded output signal is optimized.

To enable the selection step to select, via said selection signal, the correct signal from which the reference image enabling the quality of the video output signal to be enhanced is taken, the invention provides two solutions.

In a first solution, the decoding method is notable in that it comprises:

a first quality measurement step for measuring the quality of said decoded output signal when said reference image is taken from said decoded base layer signal, in order to generate a first quality measurement;

a second quality measurement step for measuring the quality of said decoded output signal when said reference image is taken from said decoded output signal, in order to generate a second quality measurement;

a comparison step for comparing the first quality measurement and the second quality measurement;

a generating step for generating said selection signal from the result produced by said comparison step, said selection signal reflecting the signal from which the reference image is taken to obtain the best quality for the decoded output signal.

The quality measurement steps enable the best reference image to be selected to optimize the quality of the video output signal without having to know the characteristics of the coding of the coded base layer signal received by the decoder. The decoder according to the invention is thus flexible since it can be used with base layer signals that have been coded (or code-converted) by reference to reference images taken from different signals, while at the same time it ensures optimum quality for the decoded output signal.

To propose a solution that is less costly in terms of calculating resources, the quality measurement steps may advantageously be performed on a limited number of images to determine whether the reference images need to be taken from the decoded base layer signal or the decoded output signal. The same selection in respect of the reference image is then made for the subsequent images, the assumption being made that the coding characteristics of the coded base layer signal do not change.

In a second solution, the decoding method is notable in that it comprises:

a data-extraction step for extracting, from said enhancement layer signals, data that indicates the signal from which the reference images used for generating the base layer signal were taken;

a generating step for generating said selection signal from said data, said selection signal reflecting the signal from which the reference image should be taken to obtain the best quality for the decoded output signal.

This solution is advantageous because the selection signal is extracted directly from the content of the coded enhancement layer signals. This gives a solution that is economical in terms of resources because no quality measurement step and no comparison step are required to determine the signal from which the reference image to be used for the step of compensating the base layer signal is to be taken.

This second solution does however call for special coding of the video signals received by the decoder according to the invention.

For this purpose, the invention also relates to a video coding method for coding a video-input signal, said coding method comprising:

a first coding step for coding and generating a coded base layer signal from the video input signal, said coded base layer signal being coded by reference to a reference image;

a second coding step for coding and generating at least one enhancement layer signal.

The coding method according to the invention is notable is that it comprises an insertion step for inserting data in said enhancement layer signals, said data indicating the signal from which the reference images used for generating the base layer signal were taken.

The invention also relates to a video decoder comprising a set of means for implementing the different steps of the decoding method described above.

The invention also relates to a video encoder comprising a set of means for implementing the different steps of the coding method described above.

The invention also relates to the use of a video decoder as described above in a receiving box, the purpose of said receiving box being to supply a decoded output signal from a set of video signals comprising a base layer signal and at least one enhancement layer signal.

The invention also relates to a computer program comprising program code instructions for carrying out the different steps of the decoding method described above when said program is run on a signal processor.

The invention also relates to a computer program comprising program code instructions for carrying out the different steps of the coding method described above when said program is run on a signal processor.

The invention also relates to a video signal comprising a coded base layer signal and at least one coded enhancement layer signal, said video signal reflecting the technical characteristics of said coding method. The video signal is notable in that it comprises specific data indicating the signal from which the reference images used for generating the base layer signal were taken.

These and other aspects of the invention are apparent from and will be elucidated with reference to the embodiments described hereinafter, all of which is done by way of non-limiting example.

For the sake of clarity, the invention will be explained by considering the decoding of a set of signals comprising one base layer signal and one enhancement layer signal. The invention is not of course limited to the case of a single enhancement layer signal but may equally well be applied to a set of signals comprising a plurality of enhancement layer signals. When this is the case, the enhancement layer signals are decoded individually and then added to the decoded base layer signal.

Figure 3:
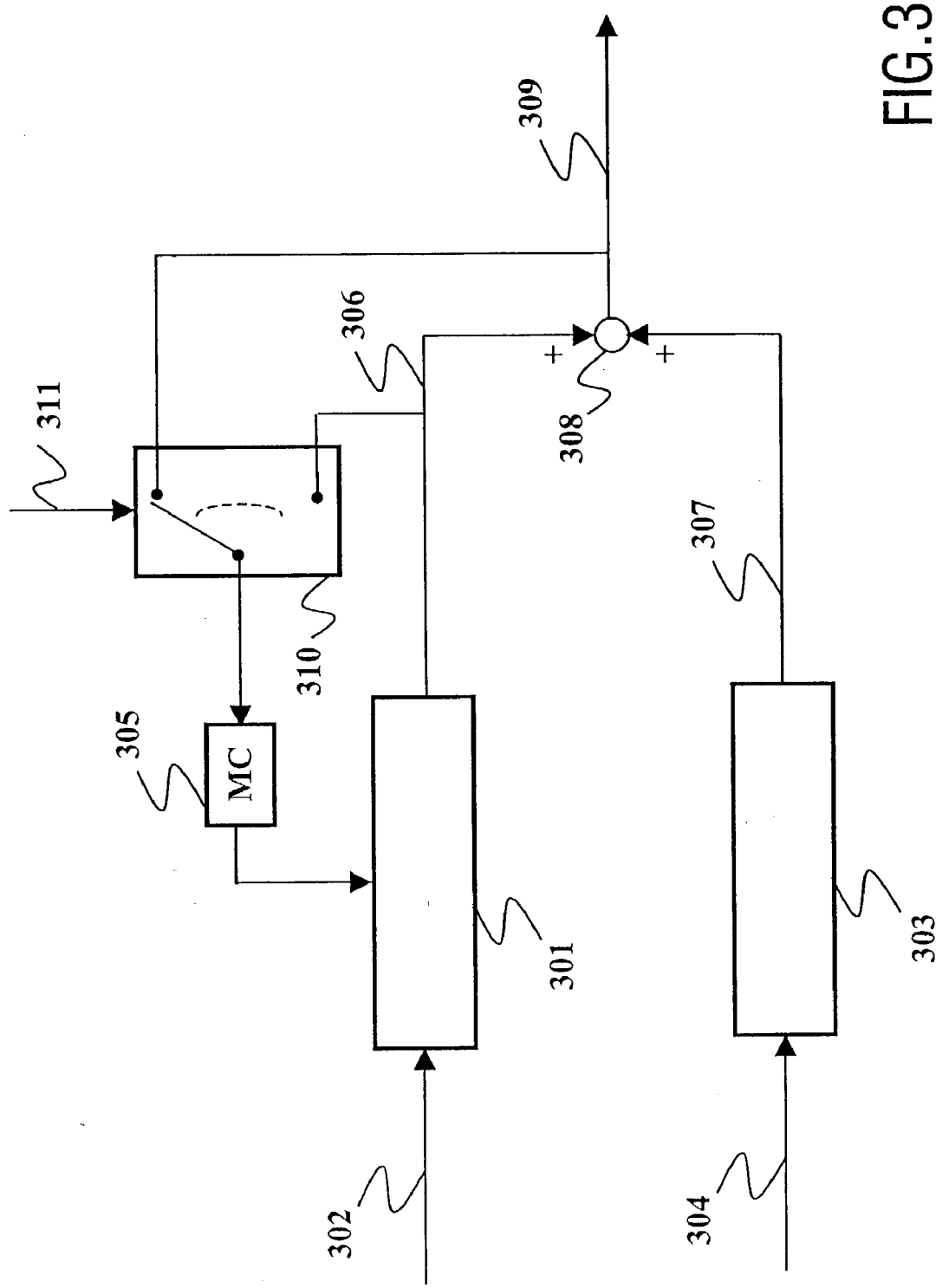
FIG. 3 shows a decoder according to the invention for decoding a base layer signal and enhancement layer signals.

FIG. 3 shows a decoding method according to the invention for decoding a base layer signal 302 and an enhancement layer signal 304.

This decoder comprises a decoding step 301 for decoding a base layer signal 302. The principle on which the decoding step 301 operates is similar to that followed in a decoding method laid down in a standard belonging to the family of MPEG standards. Hence the decoding step 301 is associated with a compensating step 305 for motion-compensation of a previously decoded reference image. Having been motion-compensated in this way by step 305, the image is added to an image of the base layer signal 302 to define a new, decoded image in a signal 306.

Figure 1:
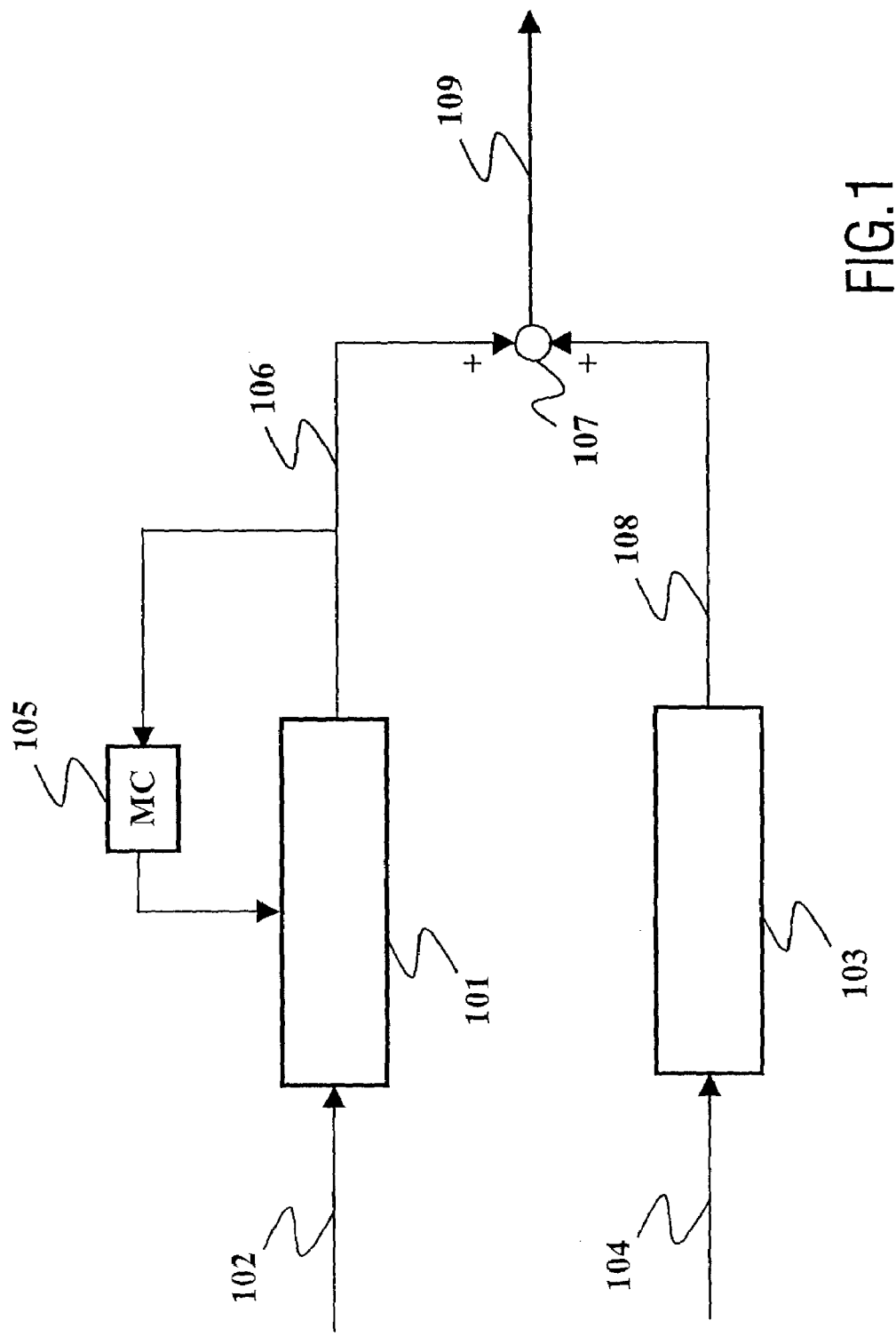
FIG. 1 shows a known; prior art decoder for decoding a base layer signal and enhancement layer signals.
Figure 2:
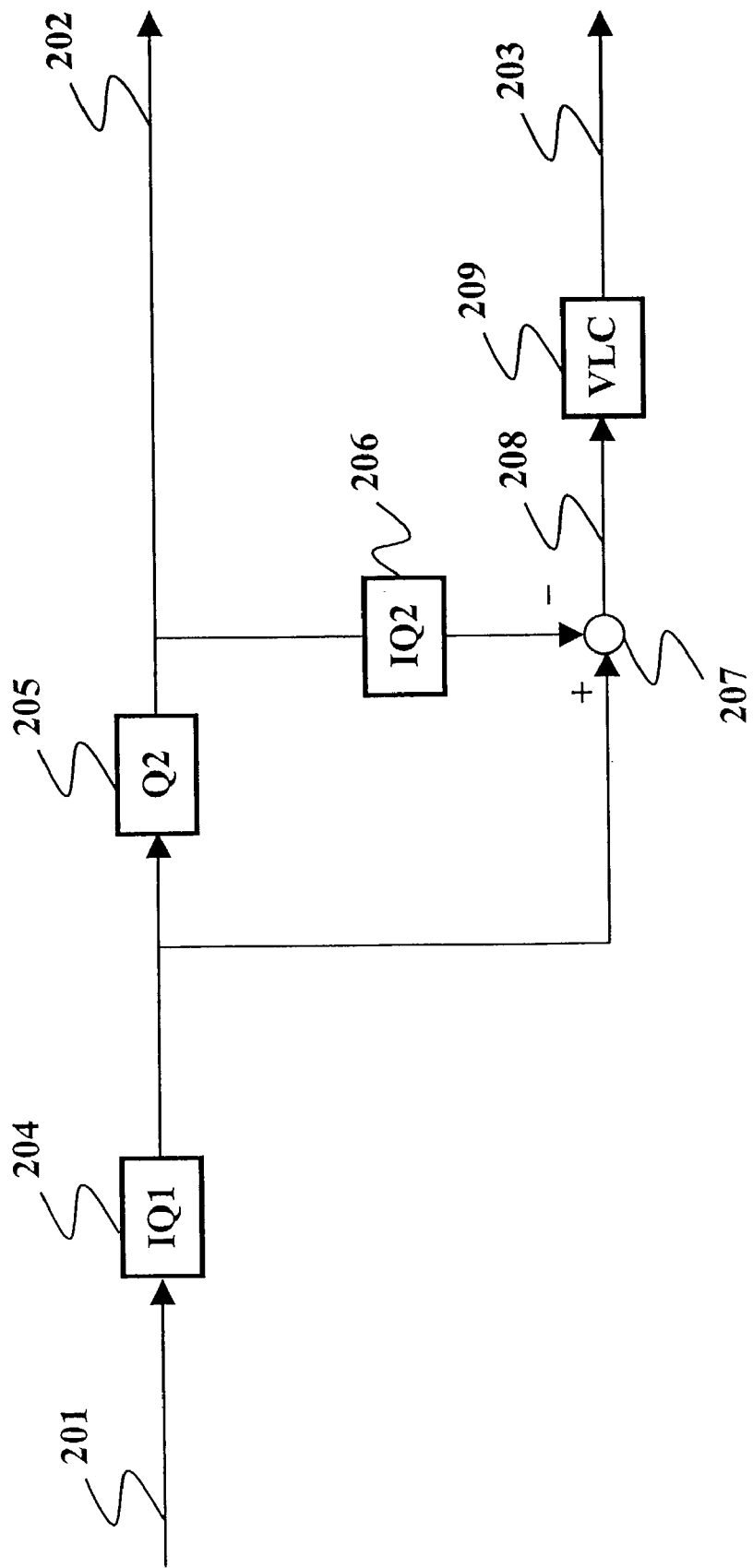
FIG. 2 shows a known, prior art encoder for generating a base layer signal and enhancement layer signals.

The decoder also comprises a decoding step 303 to decode the enhancement layer signal 304 in order to generate a decoded enhancement layer signal 307. The decoding of the enhancement layer signal 304 does not require any motion compensation because the signal represents residual coding coming from the coding that generated the base layer signal 302. For example, in the case of an enhancement layer signal generated by the coding method shown in FIG. 2, the decoding step 303 comprises a sub-step for entropy decoding.

A combination step 308 enables the content of the decoded base layer signal 306 and the content of the decoded enhancement layer signal 307 to be added together to give a decoded output signal 309.

The decoder comprises a selection step 310 that, via a selection signal 311, enables the signal from which the said reference image used by the compensating step 305 is taken to be selected. Depending on the value of the selection signal 311, the reference image is taken either from the decoded base layer signal 306 or from the decoded output signal 309.

Figure 4:
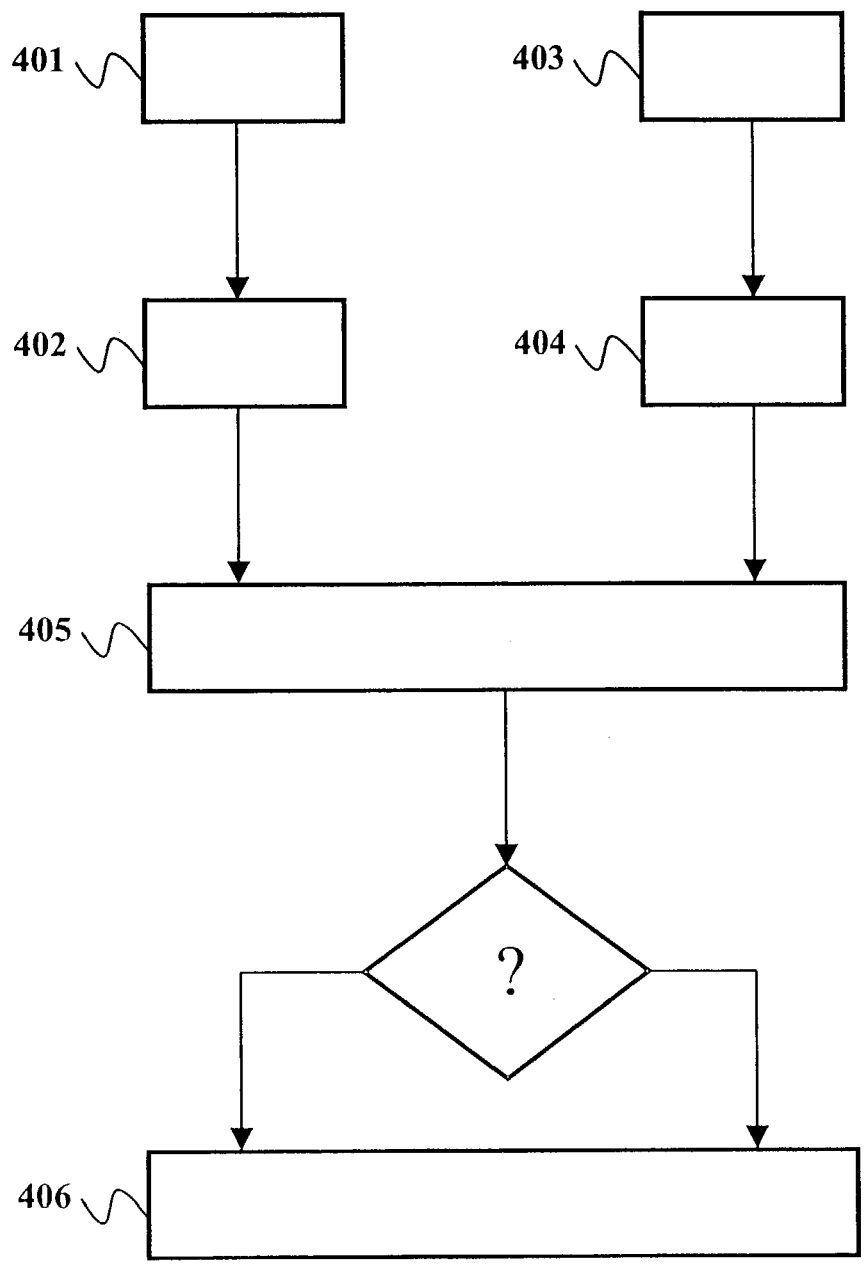
FIG. 4 shows a first solution for a decoding method according to the invention.

FIG. 4 shows a first solution for a method according to the invention for determining the signal from which the reference image to be used for decoding the base layer signal 102 should be taken. In particular, this method enables a value to be defined for the selection signal 311 that is used to control the selection step 310 described above and shown in FIG. 3

This method is based on a comparative analysis of the video quality of the decoded output signal 309, on the one hand when the reference image used for the motion compensation step 305 is taken from the decoded base layer signal 306, and on the other when the reference image used for the motion compensation step 305 is taken from the decoded output signal 309.

For the same input image of the base layer signal 302, said input image being of the predicted type, two quality measurements are made. For this purpose, the method according to the invention comprises:

a first decoding step 401 for decoding the image of the base layer signal 302 while adopting as the reference image an image taken from the decoded base layer signal 306 previously decoded by the decoding step 301;

a first quality measurement step 402 for measuring the quality of the decoded output signal 309 when said decoded base layer signal 306 comes from the first decoding step 401;

a second decoding step 403 for decoding the image of the base layer signal 302 while adopting as the reference image an image taken from the decoded output signal 309 previously decoded;

a second quality measurement step 404 for measuring the quality of the decoded output signal 309 when said decoded base layer signal 306 comes from the second decoding step 403.

Selecting the signal from which the reference image is taken results in the motion compensation by step 305 being more satisfactory or less satisfactory. In particular, if the motion compensation uses a reference image that is not optimum, the quality of the decoded output signal 309 will be poor and many 8×8-size blocks will be perceptible to the eye. Hence, and advantageously, the quality measurement steps 402 and 404 each comprise a measurement of the "block effect" in the decoded output signal 309. This type of measurement may in particular comprise derivative filtering applied to the boundaries of an imaginary grid measuring 8×8 in size in the images given by the decoded output signal 309, the set of values obtained by the derivative filtering being summed over the whole of the decoded output image 309 to generate a value that characterizes the quality of the given decoded output image. When this is the case, the value produced by the quality measurement is as much higher as the video quality is low. Quality measurement step 402 generates a first quality measurement in this way, and quality measurement step 404 generates a second quality measurement.

The method also provides a comparison step 405 for comparing the first quality measurement and the second quality measurement.

If the value given by the first quality measurement is higher that that given by the second quality measurement, the generating step 406 generates a selection signal 311 that reflects the fact that the reference image needs to be taken from the decoded output signal 309.

If on the other hand the value given by the first quality measurement is lower that that given by the second quality measurement, the generating step 406 generates a selection signal 311 that reflects the fact that the reference image needs to be taken from the decoded base layer signal 306.

In a variant of the invention, the quality measurement steps 402 and 403 are not performed on one and the same image of the decoded output signal as obtained by two methods of decoding but on a set of successive images of the decoded output signal. This improved method then calculates a first set of quality measurements when the decoding step 401 employs as its reference image an image taken from the decoded base layer signal 306, and a second set of quality measurements when the decoding step 403 employs as its reference image an image taken from the decoded output signal 309. Since the gradient of this set of quality measurements will be lower to the same extent as the drift of the video quality of the output signal is lower, the comparison step 405 advantageously compares the gradient of change in the two sets of quality measurements as a function of the position of the image in the set of images.

If the value of the gradient of the first set of measurements is greater than that of the second set of measurements, the generating step 406 generates a selection signal 311 that reflects the fact that the reference image needs to be taken from the decoded output signal 309.

If on the other hand the value of the gradient of the first set of measurements is smaller than that of the second set of measurements, the generating step 406 generates a selection signal 311 that reflects the fact that the reference image needs to be taken from the decoded base layer signal 306.

This improved method enables the value of the selection signal 311 to be defined in a more reliable way, which is preferable if the selection signal 311 is defined only once, such as, for example, at the start of the decoding of signals 302–304, and is then applied unchanged to the selection step 310 for all the rest of the images to be decoded.

Figure 5:
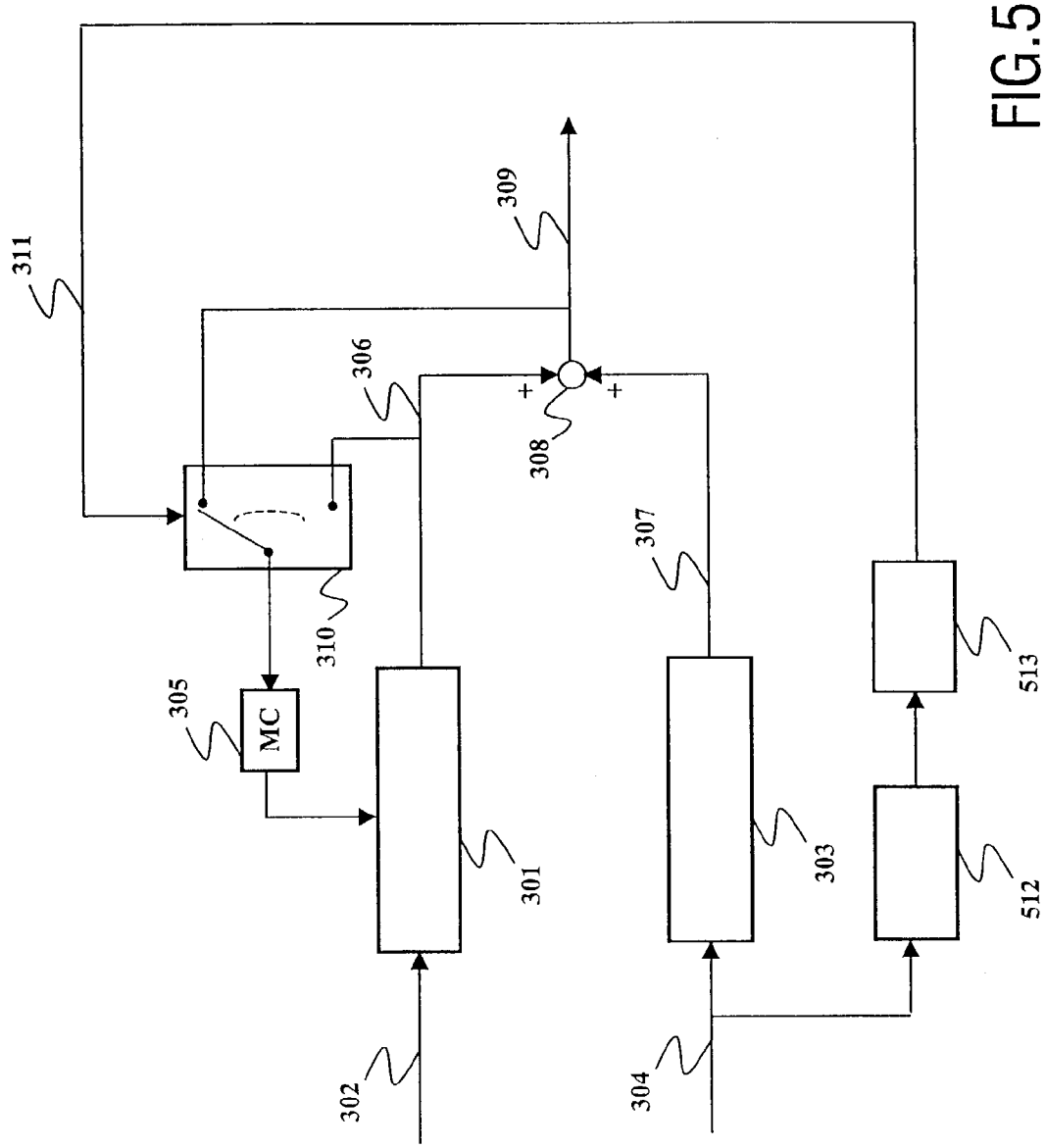
FIG. 5 shows a second solution for a decoding method according to the invention.

FIG. 5 shows a second solution for the method according to the invention for determining from which signal the reference image to be used for decoding the base layer signal is taken. In particular, this method enables a value to be defined for the selection signal 311 that is used to control the selection step 310 described above and shown in FIG. 3.

This solution is advantageous because it requires only a data processing step 512. This step 512 comprises extracting the enhancement layer signal 304 from the specific data indicating the signal from which the reference images used for generating the base layer signal 302 were taken. After extraction, said specific data is made use of by the generating step 513 that enables the selection signal 311 to be generated.

Hence, if the specific data extracted by step 512 indicates that the base layer signal 302 is the result of coding of a primary signal using reference images taken from said primary signal, the selection signal 311 is such that it will result in the selection by the selection step 310 of a reference image taken for the decoded output signal 309.

If on the other hand the specific data extracted by step 512 indicates that the base layer signal 302 is the result of coding of a primary signal using reference images taken from said base layer signal, the selection signal 311 is such that it will result in the selection by the selection step 310 of a reference image taken from the decoded base layer signal 306.

This solution does however call for a base layer signal and an enhancement layer signal containing specific data of this kind to be generated.

Figure 6:
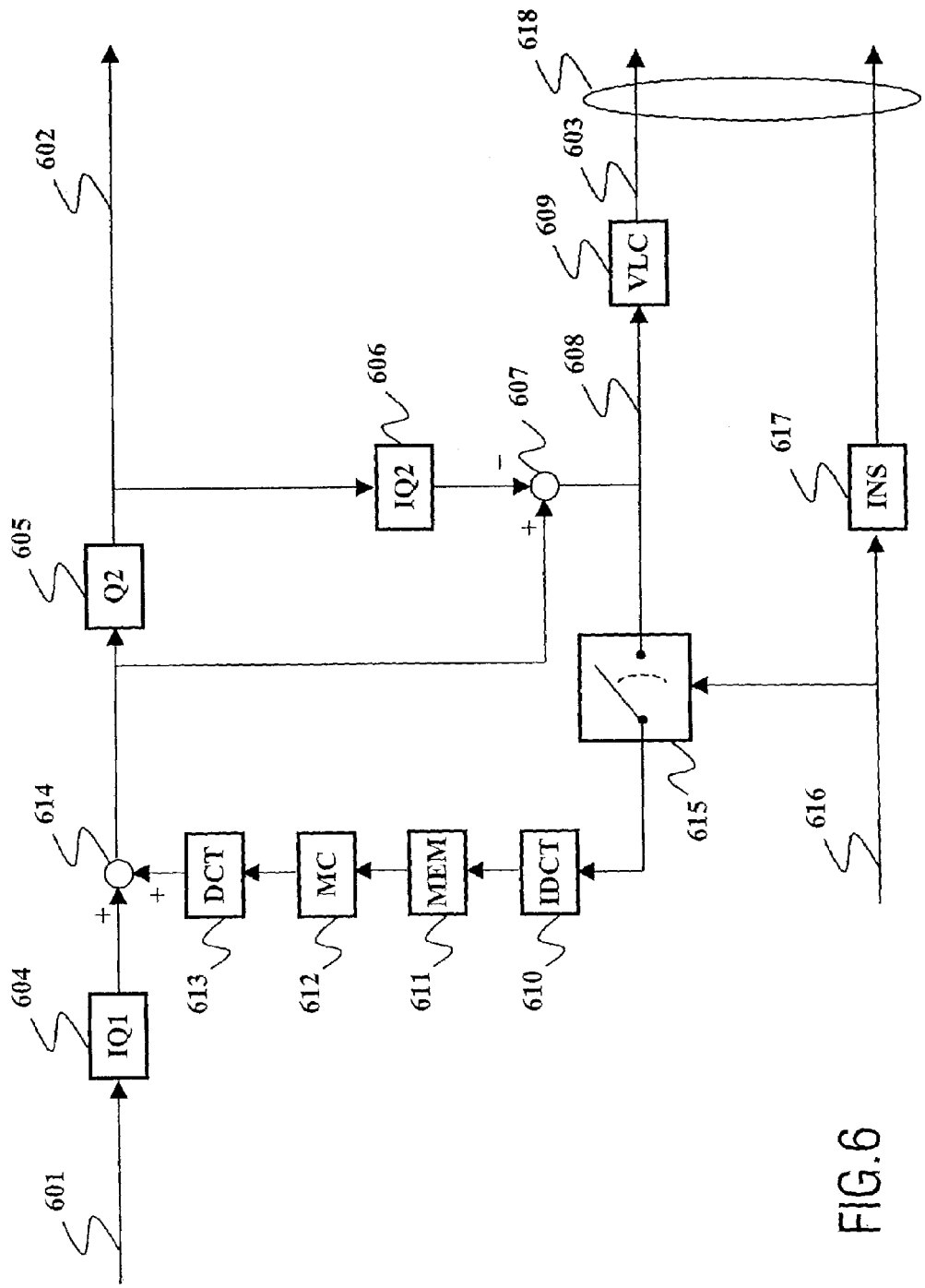
FIG. 6 shows an encoder according to the invention for generating a base layer signal and enhancement layer signals.

FIG. 6 shows a code conversion method according to the invention which enables a set of signals comprising a base layer signal 602 and at least one enhancement layer signal 603 to be generated from a coded video signal 601, which video signal is the result of, for example, coding to a standard belonging to the family of MPEG standards. This code conversion method comprises:

a dequantizing step 602 for dequantizing the input signal 601 by a factor IQ1;

a quantizing step 605, for quantizing by a factor Q2, that enables the coded base layer signal 602 to be generated;

a dequantizing step 606 that, in association with a subtracting step 607, enables an error coding 608 to be generated;

an entropy coding step 609 that enables the enhancement layer signal 603 to be generated;

a motion compensating step comprising, in series, a reverse discrete cosine transform sub-step 610, a storage sub-step 611 for storing a coding error from a previously coded image, a motion compensation sub-step 612 for motion compensation of said previously coded coding error, a discrete cosine transform sub-step 613 to generate a motion-compensated coding error that is added, via an adding step 614, to the signal supplied by step 604.

The code conversion method according to the invention also comprises a selection step 615 controlled by a selection signal 616. Depending on the value given to the selection signal 616, the selection step enables the code conversion method to generate said coded base layer signal 602 with or without motion compensation. When motion compensation is disabled, the selection step 615 is equivalent to an open switch, whereas when it is enabled, selection step 615 is equivalent to a closed switch.

In parallel, the selection signal 616 is transmitted to a data inserting step 617 that enables specific data indicating the signal from which the reference images used for generating the base layer signal 602 were taken to be inserted in the content of the enhancement layer signal 603 (or in that of a plurality of enhancement layer signals where required).

In the case of the code conversion method shown in FIG. 6, when motion compensation is enabled the specific data inserted reflects the fact that the base layer signal was generated by taking reference images from the base layer signal 602. When on the other hand motion compensation is disabled, the specific data inserted reflects the fact that the base layer signal was generated by taking reference images from the input signal 601.

Advantageously, the specific data is inserted in the image headers in the enhancement layer signal 603. The association of said specific data and the enhancement layer signal 603 forms a specific enhancement layer signal 618 that is intended, advantageously, to be decoded by a decoder according to the invention as described above.

The method of inserting specific data that indicates the signal from which the reference images used for generating the base layer signal were taken has been presented only in the context of a code conversion method. The method of inserting specific data may however also be applied to a video encoder that generates, from a video input signal that has not been coded to a standard belonging to the family of MPEG standards, a base layer signal and at least one enhancement layer signal.

The coding and decoding methods according to the invention may be implemented in a video encoder and a video decoder respectively. For this purpose, it is envisaged that recourse will be had on the one hand to elements of the hardware type (of the memory, signal processor, etc. type, for example) and also to elements of the software type (such for example as computer programs comprising program code instructions for executing the different steps of the coding and decoding method when the programs are run on one or more signal processors).

A video coder and decoder according to the invention may be used in an item of electronic apparatus of the set-top box type for receiving video signals for television.

The decoding method according to the invention may also advantageously be used in cases where enhancement layer signals have been lost in the course of their transmission to the decoder according to the invention. When this is the case, the invention enables a selection to be made, from the decoded base layer signal and the decoded output signal, of that signal from which the reference image giving the best motion compensation, and hence the best video quality for the decoded output signal, needs to be taken.

The invention claimed is:

1. A video decoding method for decoding a set of video signals comprising a base layer signal and at least one enhancement layer signal and for supplying a decoded output signal, the decoding method comprising:

decoding the base layer signal and supplying a decoded base layer signal;

decoding the enhancement layer signals and supplying decoded enhancement layer signals;

combining the decoded base layer signal and the decoded enhancement layer signals to supply the decoded output signal;

selecting, as a function of a selection signal, one of the decoded base layer signal and the decoded output signal from which a reference image is taken;

measuring the quality of said decoded output signal when said reference image is taken from said decoded base layer signal, in order to generate a first quality measurement;

measuring the quality of said decoded output signal when said reference image is taken from said decoded output signal, in order to generate a second quality measurement;

comparing the first quality measurement and the second quality measurement; and generating said selection signal from the result produced by said comparison step, said selection signal reflecting the signal from which the reference image is taken to obtain the best quality for the decoded output signal.

2. The video decoding method according to claim 1, further comprising:

extracting from said enhancement layer signals data indicating the type of motion compensation used for coding said base layer signal;

generating a selection signal from said data, the selection signal indicating one of the decoded base layer signal and the decoded output signal from which a reference image should be taken to obtain the best quality for the decoded output signal; and selecting, as a function of a selection signal, the one of the decoded base layer signal and the decoded output signal from which said reference image is taken.

3. A video decoder for decoding a set of video signals comprising a base layer signal and at least one enhancement layer signal and for supplying a decoded output signal, the decoding decoder comprising:
- a decoding element decoding the base layer signal to supply a decoded base layer signal, the decoding element including a compensating element for motion compensation of a reference image, the decoding element further decoding the enhancement layer signals to supply decoded enhancement layer signals;
- a combining element combining the decoded base layer signal and the decoded enhancement layer signals to supply the decoded output signal
- a first quality measurement element measuring the quality of the decoded output signal when the reference image is taken from the decoded base layer signal, to generate a first quality measurement;
- a second quality measurement element measuring the quality of the decoded output signal when the reference image is taken from the decoded output signal, to generate a second quality measurement;
- a comparison element comparing the first quality measurement and the second quality measurement;
- a generating element for generating a selection signal from the comparison of the first and second quality measurements, the selection signal reflecting one of the decoded base layer signal and the decoded output signal from which the reference image is taken to obtain the best quality for the decoded output signal;
- a selection element for selecting, as a function of a selection signal, the one of the decoded base layer signal and the decoded output signal from which the reference image is taken.

4. The video decoded according to claim 3, wherein said video decoder is included in a set-top box.

5. A computer program, embedded in a computer-readable medium, that includes computer executable instructions to perform acts comprising:
- decoding the base layer signal and supplying a decoded base layer signal;
- decoding the enhancement layer signals and supplying decoded enhancement layer signals;
- combining the decoded base layer signal and the decoded enhancement layer signals to supply the decoded output signal;
- selecting, as a function of a selection signal, one of the decoded base layer signal and the decoded output signal from which a reference image is taken;
- measuring the quality of said decoded output signal when said reference image is taken from said decoded base layer signal, in order to generate a first quality measurement;
- measuring the quality of said decoded output signal when said reference image is taken from said decoded output signal, in order to generate a second quality measurement;
- comparing the first quality measurement and the second quality measurement; and
- generating said selection signal from the result produced by said comparison step, said selection signal reflecting the signal from which the reference image is taken to obtain the best quality for the decoded output signal.

* * * * *